United States Patent [19]

Sasabe et al.

[11] B 3,922,711

[45] Nov. 25, 1975

[54] COLOR SIGNAL CORRECTION IN A COLOR FACSIMILE

[75] Inventors: Kaoru Sasabe, Ikeda; Yoshihiro Okino, Kyoto; Heijiro Hayami, Takatuski, all of Japan

[73] Assignee: Matsushita Electric Industrial Co., Ltd., Osaka, Japan

[22] Filed: Mar. 29, 1972

[21] Appl. No.: 239,289

[44] Published under the Trial Voluntary Protest Program on January 28, 1975 as document no. B 239,289.

Related U.S. Application Data

[63] Continuation-in-part of Ser. No. 786,267, Dec. 23, 1968, abandoned.

[30] Foreign Application Priority Data

| | | |
|---|---|---|
| Jan. 6, 1968 | Japan | 43-1025 |
| Apr. 18, 1968 | Japan | 43-25959 |
| Apr. 18, 1968 | Japan | 43-25960 |
| Apr. 18, 1968 | Japan | 43-25961 |
| Apr. 26, 1968 | Japan | 43-28983 |

[52] U.S. Cl. .......... 358/75

[51] Int. Cl.² .......... H04N 1/46

[58] Field of Search .......... 178/5.2 A

[56] References Cited

UNITED STATES PATENTS

| | | | |
|---|---|---|---|
| 2,316,581 | 4/1943 | Hardy et al. | 178/5.2 A |
| 2,434,561 | 1/1948 | Hardy et al. | 178/5.2 A |
| 2,727,940 | 12/1955 | Moe | 178/5.2 A |
| 2,863,938 | 12/1958 | Evans et al. | 178/5.2 A |
| 2,879,326 | 3/1959 | Yule | 178/5.2 A |
| 2,932,691 | 4/1960 | Yule | 178/5.2 A |
| 2,939,908 | 6/1960 | Shapiro | 178/5.2 A |
| 2,947,805 | 8/1960 | Moe et al. | 178/5.2 A |
| 2,968,214 | 1/1961 | Kilminster | 178/5.2 A |
| 2,981,792 | 4/1961 | Farber | 178/5.2 A |
| 3,098,895 | 7/1963 | Loughlin | 178/5.2 A |
| 3,557,303 | 1/1971 | Jordan | 178/5.2 A |

*Primary Examiner*—Robert L. Griffin
*Assistant Examiner*—George G. Stellar
*Attorney, Agent, or Firm*—Stevens, Davis, Miller & Mosher

[57] ABSTRACT

In a color facsimile system, a color signal processing system wherein carriers from a common carrier generator are modulated respectively with color signals corresponding to three color components of the original picture and then color correction is electrically effected, thus fine and stable color correction being attained.

3 Claims, 16 Drawing Figures

COLOR SIGNAL CORRECTION IN A COLOR FACSIMILE

CROSS-REFERENCES TO RELATED APPLICATIONS

This application is a continuation-in-part of application Ser. No. 786,267, filed on Dec. 23, 1968 now abandoned.

FIELD OF THE INVENTION

This invention relates to a signal processing method in a color facsimile system.

SUMMARY OF THE INVENTION

The primary object of this invention is to provide a simple and reliable method for color correction in a color facsimile system.

The second and additional object of this invention is to provide a method for modifying the color electric signals so as to fit the gamma characteristics of the recording film on which the color picture is to be reproduced.

The third object of this invention is to provide a method for obtaining a color signal which is to be processed in connection with the above-mentioned primary object of this invention.

According to this invention, as the picture signals are modulated on carriers of the same frequency and the same phase, no circuit for passing or compensating the DC component contained in the picture signals is necessary, and an AC circuit which is easy to adjust and stable during operation can be used. Further, as the system is arranged so that the signal is fed back from a higher level to a lower level, an amplifier or a phase inverter is not necessarily required in a color correcting masking matrix employed, and the circuit network can be constituted in a very simple manner using resistors only. The method of this invention will be advantageously adopted for the color correcting device of color facsimile systems as well as color television systems.

DESCRIPTION OF THE PREFERRED EMBODIMENTS

Figure 1:
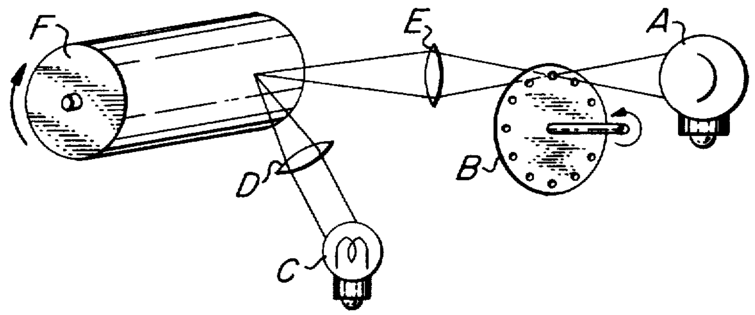
FIG. 1 PRIOR ART
FIGS. 1 and 2 are schematic diagrams showing examples of conventional methods for color separation in a color facsimile system.
Figure 2:
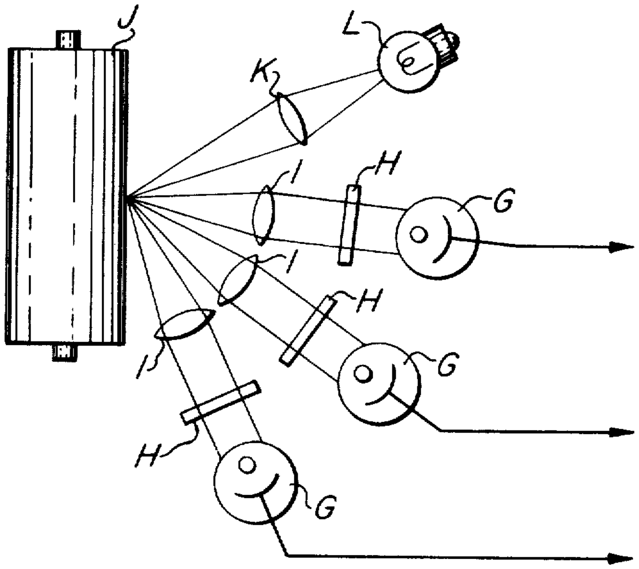
FIG. 2 PRIOR ART

Referring to FIGS. 1 and 2, markings E, D, I, K indicate optical systems such as lenses, markings C and L light sources or lamps, and F and J drums supporting an original picture.

In one of the typical color separation systems in the color facsimile (FIG. 1), color separation filters B corresponding to red, green and blue (hereafter, abbreviated as R, G and B) are sequentially placed on the path of a light beam reflected from the black-and-white picture toward the photoelectric detector A. In another type of conventional color separation system (FIG. 2), three sets of photoelectric detectors G associated with color filters H respectively of R, G and B are provided in parallel. The former system in which the color signals of the respective colors are sequentially produced, cannot be used for a system in which three color signals are simultaneously transmitted, received and reproduced, nor can it be incorporated with the color correction system for color signals in which the correction is performed simultaneously on three color signals. On the other hand, the latter system as shown in FIG. 2 which requires three sets of the combined optical system and photoelectric transducer disposed in parallel, has a fatal disadvantage in the physical constitution of the device.

Figures 3, 4:
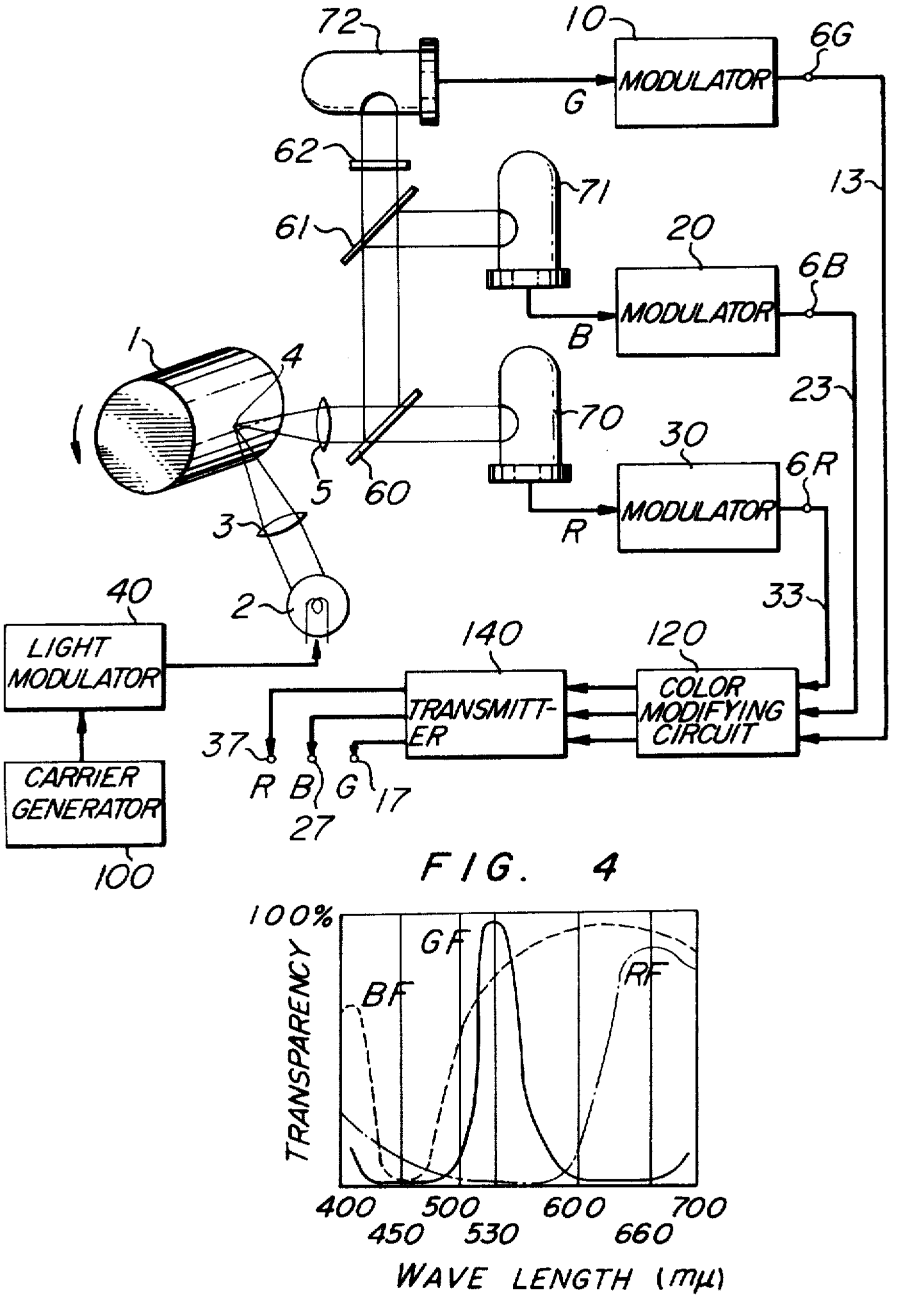
FIG. 3 is a schematic diagram illustrating the color separation method used in an embodiment of this invention in a color facsimile system.
FIG. 4 shows characteristics of the optical filters used in the apparatus of FIG. 3.

In order to remove disadvantages encountered in the conventional systems as shown in FIGS. 1 and 2 and to obtain three color signals expedient for the color correction method used in embodiments of this invention, a colour separation method as shown in FIG. 3 is provided.

Referring to FIG. 3, reference numeral 1 indicates a rotatable drum on which the picture to be transmitted is placed and 2 indicates a light source which may be an incandescent lamp or a discharge lamp which can be modulated. The light from the source 2 is focused as a light spot 4 on the picture, and reflected light from the light spot 4 is converged into a parallel beam through a lens 5. This converging process is necessary because the filtering characteristic of a dichromic mirror varies with the incident angle of incident light and a dispersing light is obstructive to distinct color separation.

The converged light is then introduced to a dichroic mirror 60 which passes only red light as indicated with the curve RF in FIG. 4. The red light passed through the dichroic mirror 60 is led to a photoelectric multiplier 70 which is sensitive particularly to red light. The remaining light other than the red light is reflected by the dichroic mirror 60 and led to another dichroic mirror 61 which has filtering characteristics as indicated by curve BF in FIG. 4 and reflects blue light which is received by another photoelectric multiplier 71. The light passed through the dichroic mirror 61 is filtered through another filter 62 which has a characteristics shown by curve GF in FIG. 4, and the filtered green light is received by the third photoelectric multiplier 72. In the above arrangement, the differences in manner in which the respective dichroic mirrors operate derive from the following reasons. As to the blue light, the light from an incandescent lamp that is relatively low in color temperature contains relatively little blue light, and blue light is dealt with by a dichroic mirror more effectively in reflection than in transmission. The remaining light deprived of the red and blue components may still contain light components other than green, which are filtered out through the dichroic mirror 62 or a green filter of narrow pass-band. The thus obtained color signals are fed to modulators 30, 20, 10 to modulate respective carriers. Modulation may be achieved in such a manner that the biasing high anode voltage for the photoelectric multipliers is varied in synchronization with a carrier frequency, or the light from the light source 2 is modulated by a light-modulator 40 with the carrier frequency. With the latter arrangement, the electric modulators 10, 20, 30 are not required. The modulated carriers undergo color modification through a color modifying circuit 120 and then are led to transmission lines through a transmitter 140.

In short, according to the above-described arrangement in which an incandescent lamp is used as the light source which is not necessarily satisfactory in the chromatic characteristics but most easy to handle, the reflected light from the luminous spot focused on the original picture is converged into a parallel beam and is projected to a dichroic mirror 60 that transmits only red light, the transmitted red light being led to a photoelectric multiplier 70, while the reflected light is projected to the second dichroic mirror 61 which reflects blue light but transmits the remaining light. The reflected blue light is led to the second photoelectric multiplier 71, while the transmitted light which is deprived of red and blue, is introduced to the third photoelectric multiplier 72 through a green filter or an equivalent 62. When the light source 2 is not modulated, the outputs from the respective photoelectric multipliers, that is, picture signals corresponding to three color components are used for modulating the carriers, and the modulated carriers are transmitted after being modified in regard to the color. Such an arrangement has the following advantages: the apparatus can be constructed in smaller size and it is easier in operation; the color separation is achieved with high selectivity and high efficiency; signal to noise ratio of the output signal is improved as the photoelectric multiplier receives a parallel beam; the suitable transparency characteristics of the dichroic mirrors reduces chromatic deviation; and for modification or correction of the color signal can be conveniently performed, as the component signals corresponding to three colors are transmitted simultaneously. Further, the original scanning section, that is, the assembly of the section for providing color signals to the first dichroic mirror, which includes the light source and scanning device, is interchangeable with the corresponding assembly of a common black-and-white facsimile system.

Next, the transmission of the picture signal and the reproduction of the color picture will be described. At the receiving end, the picture is reproduced either by the additive mixture method in which filters of the same colors as those at the sending end are used, or by subtractive mixture in which filters of the supplementary colors of those at the sending end are used. In either case, a color correcting process is usually performed on the signals either in the transmitter or in the receiver, since the transparency-wavelength characteristics and the spectral reflection characteristics of the recording medium are considerably deviated from the desirable ones. Without any modification of the colors, satisfactory reproduction of a color picture will be hardly achieved. However, if color correction or modification is performed directly on the color separation signals, as against on a carrier modulated by the separation signals, it will meet various difficulties in the operation and control, because a separation signal usually contains DC components. The above-mentioned difficulties are overcome and color modification is achieved by a simple and reliable method described below.

Figure 5:
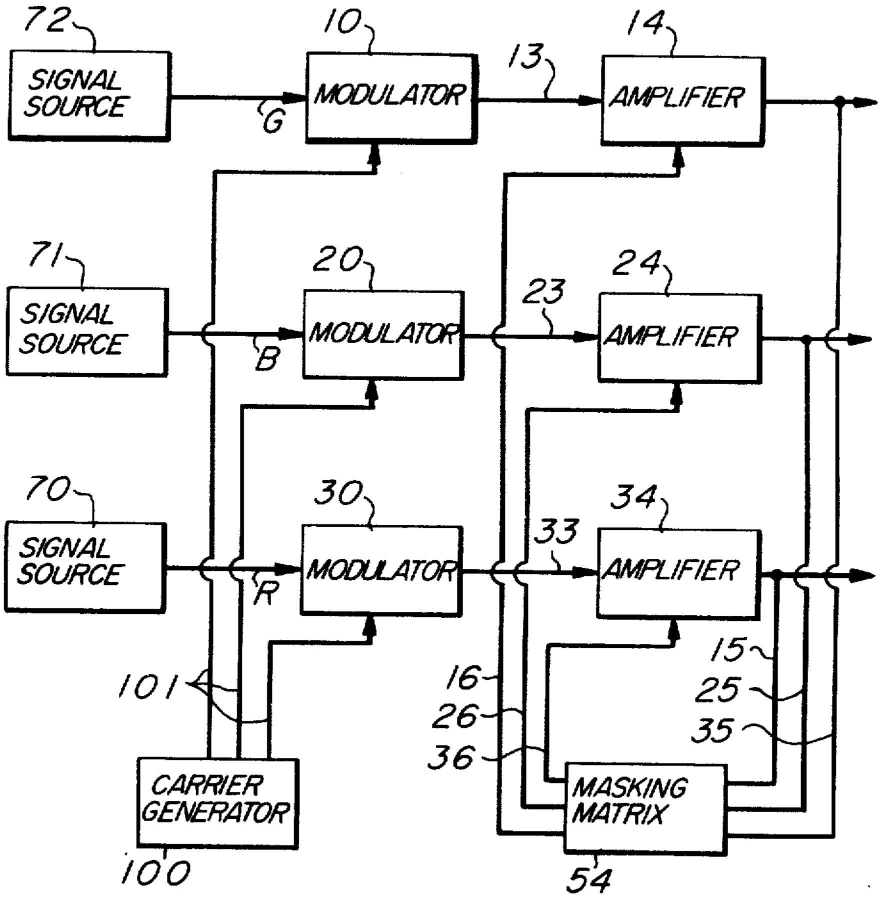
FIGS. 5, 6 and 7 are block diagrams relating to embodiments of this invention in a color facsimile signal.

Such a method will be described in connection to an embodiment and with reference to FIG. 5 which shows a more practical block diagram of a part of the arrangement shown in FIG. 3 assuming that an unmodulated light source is used. Color signals G, B and R produced by signal sources 72, 71, 70, respectively corresponding to three color components (green, blue and red) of the original picture, are fed to modulators 10, 20, 30 which are supplied with carriers 101 respectively from a common carrier generator 100, and modulate the carriers respectively. The modulated carriers 13, 23, 33 (hereafter, referred to as color carriers) are then led to amplifiers 14, 24, 34 to which is connected a cross masking matrix circuit 54 which includes a network for each of the three component colors, said network being constituted so that superimposition of the particular color carrier on the other two color carriers is not permitted, though superimposition of said two color carriers on said particular carrier is possible. The respective color carriers 15, 25, 35 from the respective amplifiers 14, 24, 34 are fed to the cross masking matrix circuit 54 and undergo the superimposition of the other color carriers. The respective superimposed color carriers 16, 26, 36 are returned to the amplifiers 14, 24, 34 where the respective color carriers interact so as to suppress the other color carriers. And the respective corrected color carriers are supplied to the transmitter 140 shown in FIG. 3.

Since the picture signals to be corrected in color are modulated on a carrier prior to the color correcting process as is seen from the above-described arrangement, the circuits for passing the DC components can be eliminated, and AC circuits which are easy to control and stable during operation can be used. Further, as the carriers are supplied from a common carrier generator, no deviation of phase will occur among the respective color carriers. Therefore, fine and stable color modification is attained with high reliability and easiness. Moreover, the processing is done on the modulated signal, that is, an AC signal, a differential signal can be easily obtained by feeding back the signal negatively. Further, a great advantage of this modulated wave color masking method is that the correction or modification is effected almost equally over the whole frequency band of the facsimile signal which ranges from DC signal to a fairly high frequency.

Next, a method of the tone correction and color masking which are performed on carriers of the same origin, will be described with reference to an embodiment.

Figure 6:
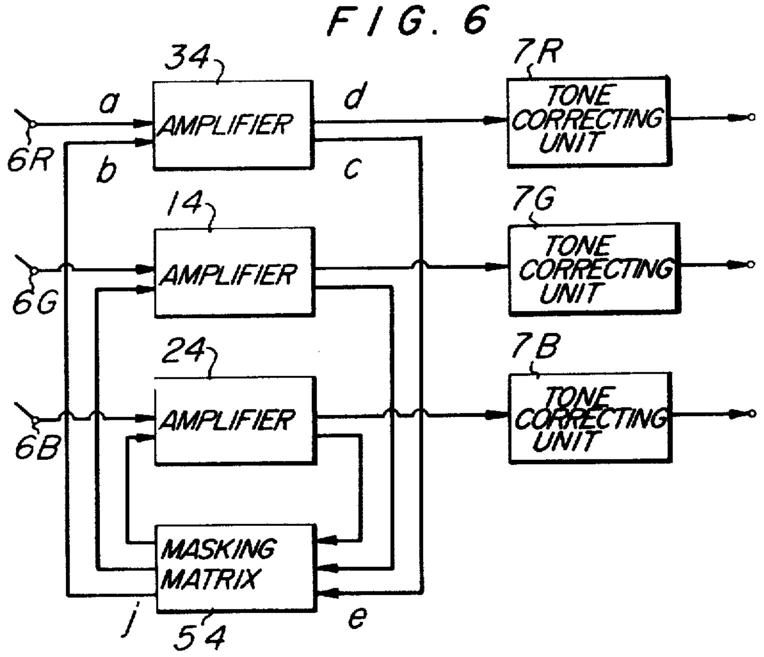
Figure 8A:
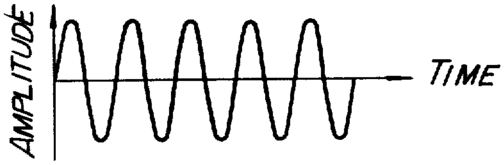
FIGS. 8*a*, 8*b* and 8*c* show waveforms in the process of the tone correction of a color signal.
Figure 8B:
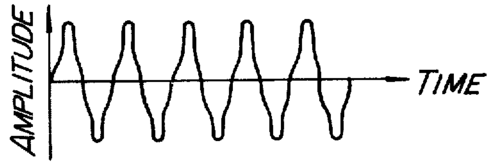
Figure 8C:
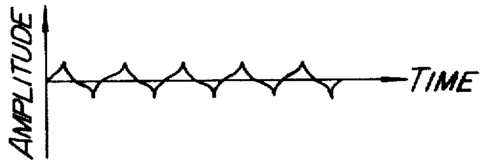
Figure 9A:
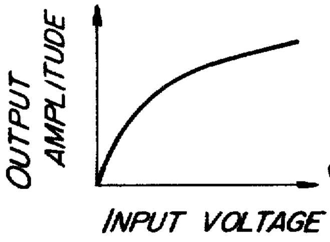
FIGS. 9*a* and 9*b* are diagrams showing the effects of the tone correction on the output.
Figure 9B:
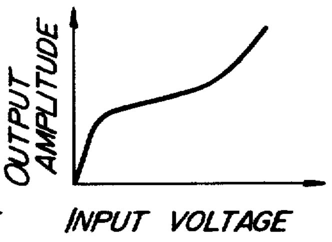

Referring to FIG. 6, the amplitude-modulated signals corresponding to three component colors are applied respectively to terminals 6R, 6G, 6B. Though these color signals are to include only the respective color components as a result of color separation, in fact the respective signals contain more or less signals of the other color components, because the wavelength characteristics of the filters or dischroic mirrors used for the color separation are not sufficiently critical and said filters or mirrors leak unintended colors. Such leaked signals will cause poor color distinction when reproduced, and must be removed. In order to climinate these undesirable signals, the respective color signals applied to the terminals 6R, 6G, 6B, which are modulated signals on carriers from a single origin are led to respective amplifiers 34, 14, 24 where the outputs are fed back to the input through the matrix circuit 54 for effecting the masking. Further, in order to provide more color tones and thereby to provide intermediate tones abundantly to the reproduced picture, the outputs from the color correction units are led to the respective tone correcting units 7R, 7G, 7B. Our experiments have shown that the amplitude characteristics of the tone correcting units 7R, 7G, 7B are such that higher level and lower portions of a signal are expanded while medium portions are less expanded. Thus, low and high tones are emphasized and tone variation can be increased. Accordingly, the picture is reproduced in softer tones and in more natural color. However, it should be noted that the outputs from the tone correcting units 7R, 7G, 7B are distorted in the waveforms as shown in FIG. **8*b* in contrast with the input as shown in FIG. 8*a*, because the signals including the carriers are processed according to the above-mentioned characteristics of the correcting units. Therefore, if it is assumed that the color signals, after modulation, are directly applied to the tone correcting units, the outputs will have distortions corresponding to those shown in FIG. 8*b*. And if the above-described color masking is carried out with such distorted signal, it will fail to fully mask the harmonics contained in such a signal as shown in FIG. 8*b*. Thus, the effect of masking will be greatly reduced, with the signal as shown in FIG. 8*c*, remaining. Such a disadvantage is removed in the arrangement described above, in which the component color signals originating from the original picture are modulated in the amplitudes on the carriers of a single origin and are treated with the color masking process and then undergo the tone correction. With this arrangement, color masking and tone correction with the same carrier are satisfactorily achieved, i.e., incompletion of the color masking due to a distortion of the waveform is removed and the color distinction is improved. Further, it is well known in this technical field that color masking is effectively performed on the color signals having logarithmic characteristics with respect to photoelectrically detected input signals as shown in FIG. 9*a*. On the other hand, a tone correction circuit has an input-output characteristic as shown in FIG. 9*b***. Though a normal color facsimile system does not comprise logarithmic circuits and color masking is usually applied to color signals having a linear relationship with the input signals, it can be said to be preferable at least that a color masking process should precede a tone correction process.

Figure 7:
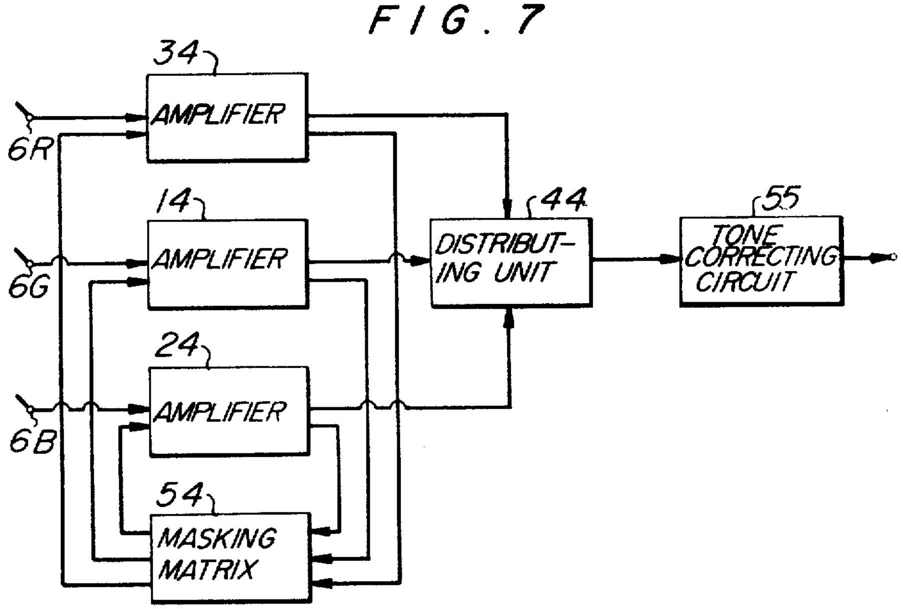

Further, according to the method described above in which color masking on the component color signals is carried out prior to the tone correction, only a single tone correcting circuit 55 (in FIG. 7) will be necessary for all the color signals if the signals are transmitted by the time sequential system, that is, if three signals are sent out on a single transmission line (for example, a telephone line) in sequence through a signal distributing unit 44 as shown in FIG. 7. Thus, equipment can be simplified.

Now, the AC masking method of this invention will be described in detail in comparison with the conventional methods.

Figure 10:
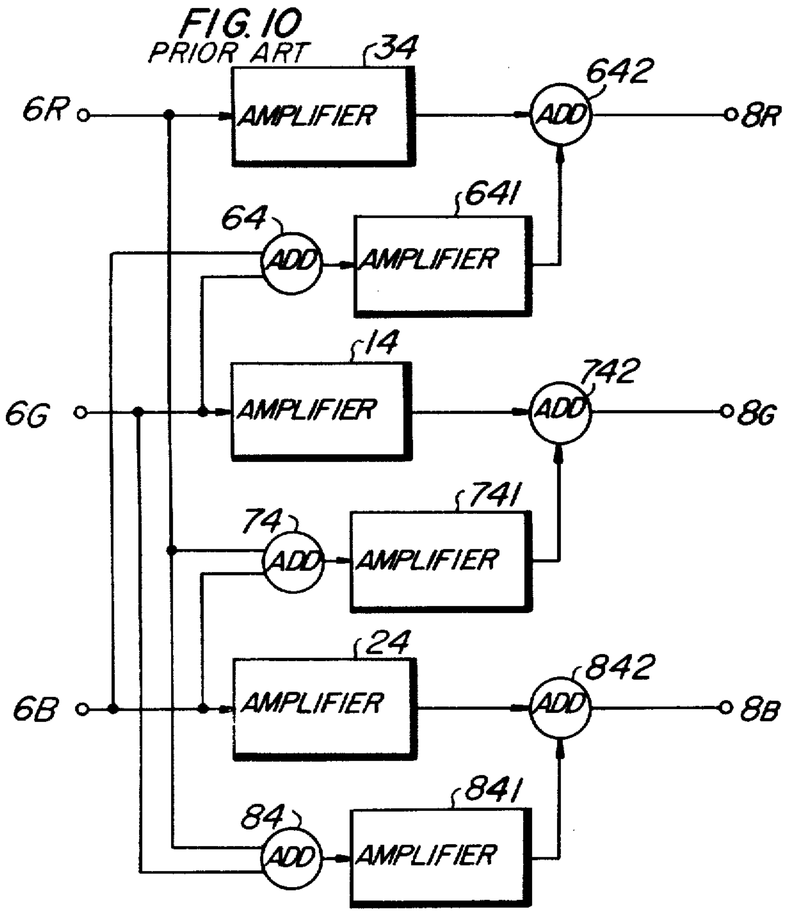
FIG. 10 is a block diagram of a conventional masking system.

Hitherto, a masking system as shown in FIG. 10 has been employed in the field of color television. In FIG. 10, reference numerals 6R, 6G, 6B indicate input terminals for the respective color signals as mentioned previously; 14, 24, 34 amplifiers for G, B and R signals respectively having gains $g_1'$, $g_2'$, $g_3'$ respectively; 64, 74, 84 adding units to add two color signals for color correction; and 641, 741, 841 amplifiers for amplifying the added signals from said adding units 64, 74, 84. The outputs from said amplifiers 641, 741, 841 are added respectively to the outputs from the amplifiers 34, 14, 24 in adder 642, 742, 842 so as to suppress the latter outputs. For example, if R signal contains the other color components, appropriate amounts of G and R signals are led to the adder 642 through the adding units 64 and the amplifier 641 and are added to the R signal so as to suppress the latter signal, thereby cancelling the G and B components contained in the R signal. The same is applicable to the correction of the G and B signals. As described above, the conventional system is handicapped by the fact that it requires many component units such as adders and amplifiers. This disadvantage is removed in a manner which will be described hereunder in connection with an embodiment.

Figure 11:
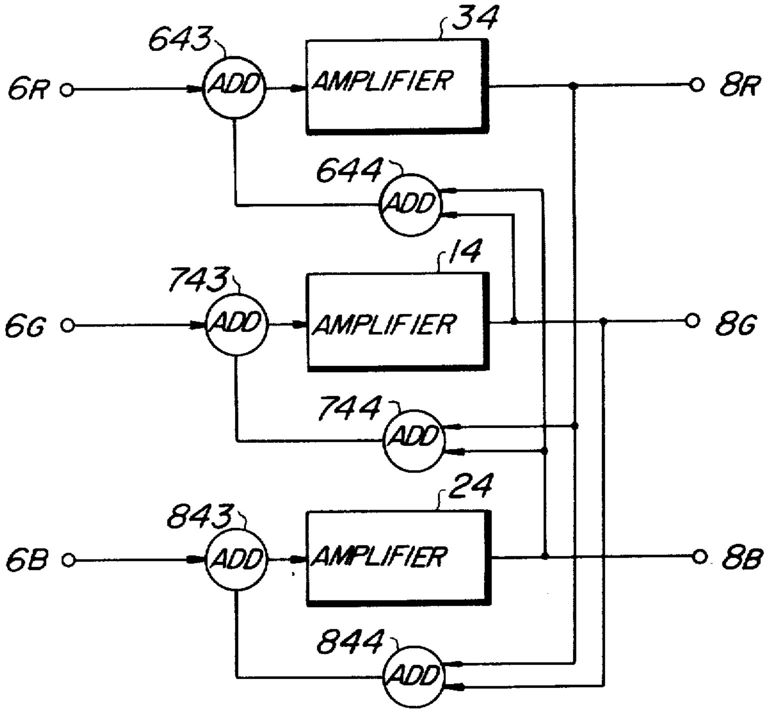
FIG. 11 is a block diagram of an embodiment of the masking system used in an embodiment of this invention.

In FIG. 11, the same reference numerals as those in FIG. 10 indicate corresponding elements or units. Reference numerals 644, 744, 844 indicate adder for adding color signals G and B, B and R, as well as R and G respectively in appropriate ratios; and 643, 743, 843 indicate adding units for adding the above-mentioned added signals to the initial R, G and B signals according to the degree of the color impurity so as to suppress said initial signals. The gains of the amplifiers in FIG. 11 will be referred to now as $g_1$, $g_2$ and $g_3$ to distinguish them from those shown in FIG. 10.

If it is assumed that when a color of original picture is only red and the pure R signal should be sent out from the transmitter in a proper operation, some amounts of G and B signals also are appearing due to some electrical or optical causes, and such signals will be reproduced into a picture of very poor saturation in red color, should it undergo no color correction. In such a case, the color rendition of the reproduced picture will be improved according to the color correction method of this invention, that is, by adding the R signal to the G and B signals respectively through the adder 744, 743 and 844, 843 so as to suppress the G and B signals. It will be understood that the same is applicable to the correction of the G signal and B signal.

Hereunder, the difference between the conventional masking methods and the method of FIG. 11 as well as the advantages of the said method over the conventional ones will be explained in detail and in theory.

It is assumed that voltages at the input terminals 6R, 6G, 6B and the output terminals 8R, 8G, 8B in FIGS. 10 and 11 are $e_{13}$, $e_{23}$, $e_{33}$ (generally, $e$) and $v_{17}$, $v_{27}$, $v_{37}$ (generally, $v$) respectively. Voltage e contains some color impurity because of cross talk in the color separating filters and in the electric circuits and transmission lines. Voltage $e$ is required to undergo the masking to become voltage $v$ in such a manner that the voltage $v$ is proportional to the chromatic vector $v_O$ of the original picture. That is, assuming that the color impurity matrix is $D$, the following equation is obtained:

$$e = D\, v_O \tag{1}$$

On the other hand, assuming that the masking matrix is $M$, the following formula is obtained, as the impure color signal e should be made proportional to $v_O$ by $M$:

$$M\,e = v = K\,v_O \qquad (2)$$

where $K$ is a constant of proportionality. Combining the equations (1) and (2), the amount of necessary masking is determined as follows.

$$M = K\,D^{-1} \qquad (3)$$

In the above equation, D is usually an unknown matrix and is a square matrix with three lines and three rows in the case of a color separation base on the hypothesis of three primary colors. It should be noted in regard to the equation (2) that if the masking is perfectly done, the output voltage $v$ is proportional to the color information of the original picture as indicated by the equation $v = K\,v_O$.

Now, turning to the conventional system shown in FIG. 10, the following equation is obtained relating to the masking matrix $M_f$, as is obvious from the figure:

$$M_f\,e = v \qquad (4)$$

On the other hand, according to the system shown in FIG. 11, the masking matrix $M_b$ is related as indicated by the following equation:

$$e = M_b\,v \qquad (5)$$

The difference between the two formulas (4) and (5) seems to be evident and simple. However, it should not be overlooked that there is a great difference between them in the technical aspects including the constitution of the masking means and easiness of adjustment. This will be clarified by the following description.

The elements of the matrix D can be indicated in three lines and three rows as follows:

$$D = \begin{pmatrix} d_{11} & d_{12} & d_{13} \\ d_{21} & d_{22} & d_{23} \\ d_{31} & d_{32} & d_{33} \end{pmatrix} \qquad (6)$$

Figure 13:
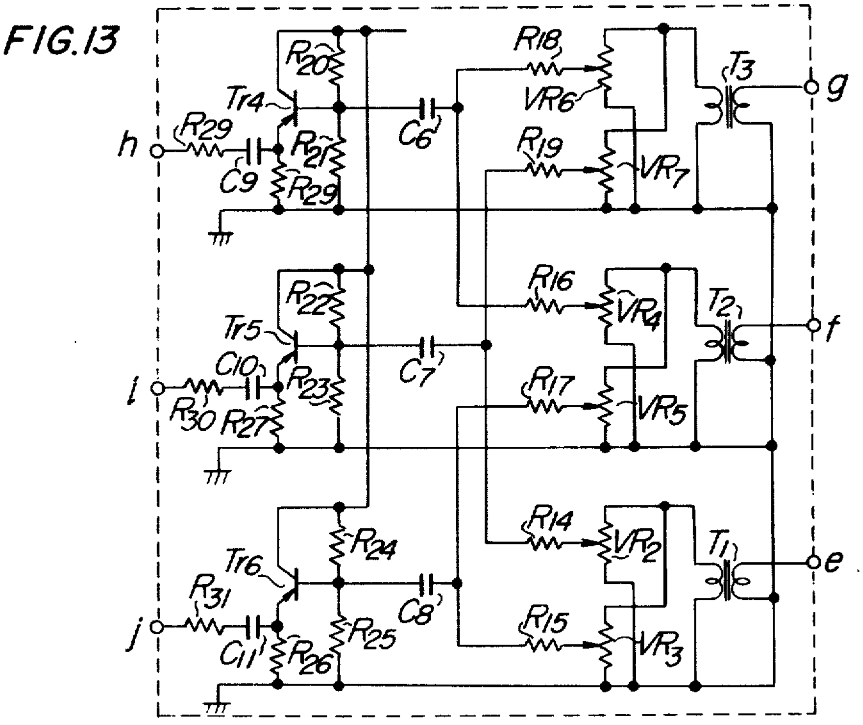
FIG. 13 shows a circuit of the color masking matrix in the same embodiment.

If the value of the variable resistors $VR_2$ to $VR_7$ in the masking matrix, as shown in FIG. 13, is indicated by m, and the gain of the amplifiers by the letter g, the following equations will be obtained:

$$M_f = \begin{pmatrix} g_1' & m_{12}' & m_{13}' \\ m_{21}' & g_2' & m_{23}' \\ m_{31}' & m_{32}' & g_3' \end{pmatrix} \qquad (7)$$

$$M_b = \begin{pmatrix} 1/g_1 & m_{12} & m_{13} \\ m_{21} & 1/g_2 & m_{23} \\ m_{31} & m_{32} & 1/g_3 \end{pmatrix} \qquad (8)$$

where the dashes in equation (7) are employed to show that this equation relates to the conventional system. From the equations (3) and (4), $M_f = KD^{-1}$; and from the equations (3) and (5), $M_b^{-1} = KD^{-1}$ Therefore $$M_b = (1/K)D$$

That is, the color impurity matrix $D$ according to the conventional method is expressed by the following equation:

$$D = K\,M_f^{-1} \qquad (9)$$

The elements of $M_f$ are constituted by variable resistors, electrically. $D$ is preferably expressed as follows:

$$D = K\,M_b \qquad (10)$$

Generally, $D$ is an unknown matrix. Therefore, it is impossible to determine $M_f$ or $M_b$ in advance. If the elements of the matrix $D$ are predetermined, $M_f$ or $M_b$ will be easily known according to such equations as $$M_f = K\,D^{-1}$$

or $$M_b = D/K.$$

That is, the only way to determine $M_f$ or $M_b$ is to adjust the magnitudes of the variable registers repeatedly until the above equation (9) or (10) is realized.

In the arrangement shown in FIG. 11 the setting of the elements of the masking matrix $M$ can be carried out with a very accurate but simple procedure as will be explained hereunder.

In an original picture to be transmitted, it is assumed that three primary colors R, G and B selected as reference colors are indicated by the following vector V.

$$V_R = \begin{pmatrix} 1 \\ 0 \\ 0 \end{pmatrix} \quad V_G = \begin{pmatrix} 0 \\ 1 \\ 0 \end{pmatrix} \quad V_B = \begin{pmatrix} 0 \\ 0 \\ 1 \end{pmatrix} \qquad (11)$$

As these are reference colors, they include no other color component. These original colors are affected by various kinds of masking during the conversion and are received as electric signals indicated by a vector $e$. To return the vector $e$ to the original vector $v$ is the object of the color masking process, which can be set by the matrix $M$.

Now, assuming that color $R$ is placed on the drum of the transmitter, then the light input $v_R$ is indicated with $$V_R = \begin{pmatrix} 1 \\ 0 \\ 0 \end{pmatrix}$$

and the electric outputs e from the photoelectric tubes are expressed as follows:

from the equations (1) and (6)

$$e = \begin{pmatrix} d_{11} & d_{12} & d_{13} \\ d_{21} & d_{22} & d_{23} \\ d_{31} & d_{32} & d_{33} \end{pmatrix} \begin{pmatrix} 1 \\ 0 \\ 0 \end{pmatrix} = \begin{pmatrix} d_{11} \\ d_{21} \\ d_{31} \end{pmatrix} \qquad (12)$$

where $d_{21}$, $d_{31}$ indicate so-called crosstalk of color which are desirable to be zero.

According to this invention, $$M_b = (1/K)D$$

from the equation (10). Therefore, by multiplying both sides by $v_R$ $$\begin{pmatrix} 1/g_1 \\ m_{21} \\ m_{31} \end{pmatrix} = 1/K \begin{pmatrix} d_{11} \\ d_{21} \\ d_{31} \end{pmatrix} \qquad (13)$$

The above relation corresponds to the following technical operation. That is, a specified primary color is placed on the transmitter, the color being converted to electric signals by photoelectric tubes, and the masking is adjusted by selecting the values of matrix elements $m_{21}$, $m_{31}$ independently, so that the outputs corresponding to the two photoelectric tubes assigned to the other primary colors are zero.

On the other hand, according to the conventional method which is indicated with the formula (4), the following relation is induced from the equation (7) and the formula (12) as to a specified primary color, e.g., red:

$$\begin{pmatrix} v_r \\ v_g \\ v_b \end{pmatrix} = \begin{bmatrix} g_1' & m_{12}' & m_{13}' \\ m_{21}' & g_2' & m_{23}' \\ m_{31}' & m_{32}' & g_3' \end{bmatrix} \begin{pmatrix} d_{11} \\ d_{21} \\ d_{31} \end{pmatrix} \quad (14)$$

However, it is impossible to make $v_g$ and $v_b$ zero only with the adjustment of the $m'$ entries. Namely, the masking cannot be satisfactorily adjusted by only determining $m_{21}'$, $m_{31}'$ independently as in this invention, it is also necessary to adjust the gains $g_1'$, $g_2'$ and $g_3'$. That is, it will be seen from the formula (14) that the following conditions must be satisfied when $R$ color is placed on the drum of the transmitter (i.e., $v_g = v_b = 0$, $v_r = 1$).

$$\left.\begin{aligned} m_{21}'d_{11} + g_2'd_{21} + m_{23}'d_{31} = 0 \\ m_{31}'d_{11} + m_{32}'d_{21} + g_3'd_{31} = 0 \end{aligned}\right\} \quad (15)$$

This corresponds to the fact that $M_f$ is determined by $M_f = K\ D^{-1}$ as is seen from the equation (9), and it means that $D^{-1}$ cannot be disposed of by only removing the cross talk $d_{21}$ from $R$ to $G$ and the cross talk $d_{31}$ from $R$ to $B$, as it is affected by cross talk $d_{12}$, $d_{13}$, $d_{23}$, $d_{32}$ respectively from $G$ to $R$, from $B$ to $R$, from $B$ to $G$ and from $G$ to B. This corresponds to the following technical operation, that is, each of the variable resistors constituting the masking matrix is repeatedly adjusted until a certain compromise is attained, and this operation is actually very difficult.

Though the difference between the conventional and the present methods might seem to be of a simple nature in the mathematical formulas, it is not so simple in the practical operations. The preferred method of this invention is by far superior to the conventional method in the effectiveness of the masking and the easiness of the adjustment, as each resistor of the matrix can be adjusted independently from the other resistors.

Figure 12:
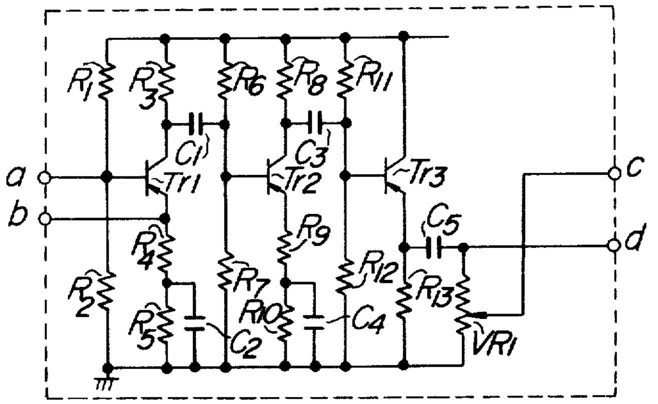
FIG. 12 shows a circuit of the amplifier in the embodiment of FIG. 6.

FIG. 12 shows an internal connection of the amplifiers 14, 24 or 34 shown in FIG. 6, and FIG. 13 the same of the cross masking matrix 54.

Hereunder, these circuits will be explained. Now, it is assumed that when only R signal should be sent out from the transmitter in a proper operation, G and B signals also are appearing in certain ratios due to some electrical or optical causes. These R, G and B signals modulate carriers originating from a single carrier generator 100 respectively in the modulators 30, 10, 20. The output from the modulator 30 is applied to the input terminal $a$ of the amplifier 34. A portion of the output of the amplifier 34 is taken out from the output terminal $c$ and is led to the input terminal $e$ of the matrix 54. The input received at the terminal $e$ is led to primary winding of an impedance converting transformer $T_1$ and applied to two potentiometers or variable resistors $VR_2$ and $VR_3$ connected in parallel across the secondary winding of said transformer $T_1$. The signals taken out from said two potentiometers according to the respective degrees of required color correction are added with color correction signals respectively of B and G after passing through resistors $R_{14}$ and $R_{15}$ which are provided to prevent the respective correction signals from leaking mutually. The resultant signals are led to impedance converting and amplifying transistors $Tr_5$ and $Tr_6$ and then are taken out through the output terminals $i$ and $j$ respectively. These outputs are applied respectively to the terminals $b$ of the amplifiers 14, 24 assigned respectively to G and B so as to suppress G and B impurity signals. Therefore, no signal will appear at the output terminal $c$ of the amplifiers 14, 24. As the R signal is naturally far higher than the G and B signals and is not eliminated by the latter signals, only the R signal is taken out. The color correction of the G and B signals will be carried out according to a similar procedure.

The above-mentioned impedance converting transformers $T_1$, $T_2$, $T_3$ are provided to prevent the output signals from the output terminals $c$ of the respective amplifiers 34, 14, 24, from being affected by connecting the output terminals $d$ to the masking matrix, and also to reverse the phase of the color correction signal, that is, the signal at the terminal $c$ if the signal at the input terminal $b$ is not in opposite phase to the original input signal at the terminal $a$. Therefore, said transformers are not necessarily with the phase relation in the color correcting units shown in FIG. 12. In this case the negative addition of the color correction signals is effected, i.e., the operation of subtraction is carried out. On the other hand, the positive addition of the color correction signals can be effected by changing the polarity of the transformers to thereby reverse the phase of the color correction signals. (Such phase inversion can be easily effected simply by reversing the connection of the terminals of the transformers.) In other words, the operation of addition or subtraction can be readily effected by coupling the color correction signals respectively to the color signals in the same or opposite phase with one another. Of course, there may be various other measures for effecting such in-phase or opposite-phase coupling, and it will not be difficult for those skilled in the art of electronic circuits to find such substitutionary measures. Thus, any circuit configuration or arrangement having suitably designed circuit constants may be employed at will without departing from the scope of the technical concept of the present invention. Further, the impedance converting and amplifying transistors $Tr_4$, $Tr_5$, $Tr_6$ too are not essential but the use of said transistors is preferable for a stable operation of the device.

The reason why the emitter of the transistor $Tr_1$ is chosen as the point where the color correction signal is added to the original signal, is to avoid influence of the addition of the correction signal.

We claim:

1. A color correction method for color facsimile transmission comprising the steps of: separating color signals of red, green and blue from a composite color signal obtained from an original picture signal; generating a plurality of carrier signals of a common frequency and phase from a common carrier generator; modulating said carriers with said separated color signals by irradiating the original picture with a light source whose intensity is modulated in synchronization with said common carrier frequency; amplifying the modulated carrier signals in amplifying means; and electrically correcting said color signals by processing said modulated and amplified carrier signals in a masking matrix circuit arranged to form feedback loops.

2. A color correction method for color facsimile transmission comprising the steps of: separating color signals of red, green and blue from a composite color signal obtained from an original picture signal; generating a plurality of carrier signals of a common frequency and phase from a common carrier generator; modulating said carriers with said separated color signals; amplifying the modulated carrier signals in amplifying means; grouping said amplified signals into combinations of two amplified signals each; adding said two amplified signals in each combination together; and adding the outputs of each of said combinations to the input of the corresponding amplifying means which produces an amplified signal not grouped with the combination whose output is being added to said corresponding amplifying means input.

3. A color correction method as claimed in claim 2, further comprising imparting a color correction signal of a magnitude according to the degree of desired color correction and preventing mutual leakage among said color correction signals when a plurality of color correction signals are processed.

* * * * *